United States Patent [19]

Synosky et al.

[11] Patent Number: 5,462,754

[45] Date of Patent: Oct. 31, 1995

[54] ABHESIVE CHEWING GUM WITH IMPROVED SWEETNESS PROFILE

[75] Inventors: Steven P. Synosky, Greenbrook, N.J.; Michael J. Greenberg, Northbrook; Gordon N. McGrew, Evanston, both of Ill.

[73] Assignee: Wm. Wrigley Jr. Company, Chicago, Ill.

[21] Appl. No.: 306,027

[22] Filed: Sep. 14, 1994

Related U.S. Application Data

[63] Continuation-in-part of PCT/US93/01940, Mar. 2, 1993, which in turn is a continuation-in-part of PCT/US92/11317, Dec. 30, 1992, which in turn is a continuation-in-part of PCT/US92/09615, Nov. 6, 1992, which in turn is a continuation-in-part of PCT/US92/01686, Mar. 3, 1992.

[51] Int. Cl.⁶ ........................................... A23G 3/30
[52] U.S. Cl. ........................................... 426/4
[58] Field of Search ........................... 426/3.6, 548, 804

[56] References Cited

U.S. PATENT DOCUMENTS

| | | | |
|---|---|---|---|
| 1,534,929 | 4/1925 | Dunham | 426/5 |
| 1,534,930 | 4/1925 | Dunham | 426/5 |
| 1,534,931 | 4/1925 | Dunham | 426/5 |
| 1,807,704 | 6/1931 | Pappadis | 426/5 |
| 2,078,878 | 4/1937 | Jackman | 99/135 |
| 2,265,465 | 12/1941 | Wilson | 99/135 |
| 2,289,407 | 7/1942 | Hampton | 99/135 |
| 2,782,123 | 2/1957 | Rubin | 99/141 |
| 3,161,524 | 12/1964 | Opie et al. | 99/94 |
| 3,262,784 | 7/1966 | Bucher | 99/135 |
| 3,632,358 | 1/1972 | Echeandia et al. | 99/135 |
| 3,766,165 | 10/1973 | Rennhard | 260/209 R |
| 3,843,818 | 10/1974 | Wren et al. | 426/346 |
| 3,857,965 | 12/1974 | Ream | 426/3 |
| 3,894,146 | 7/1975 | Tsuyama | 424/49 |
| 3,974,032 | 8/1976 | Harjes et al. | 195/31 R |
| 3,984,574 | 10/1976 | Comollo | 426/4 |
| 3,995,064 | 11/1976 | Ehrgott et al. | 426/3 |
| 3,996,389 | 12/1976 | Osborne | 426/565 |
| 4,065,579 | 12/1977 | Mackay et al. | 426/3 |

(List continued on next page.)

FOREIGN PATENT DOCUMENTS

| | | | |
|---|---|---|---|
| 0067665 | 12/1982 | European Pat. Off. | A23G 3/30 |
| 0082670 | 6/1983 | European Pat. Off. | A23G 3/30 |
| 0236271 | 9/1987 | European Pat. Off. | A61K 9/68 |
| 0252874 | 1/1988 | European Pat. Off. | A23G 3/30 |
| 0301628 | 2/1989 | European Pat. Off. | C12N 9/10 |
| 0325090 | 7/1989 | European Pat. Off. | A23G 3/30 |
| 0337889 | 10/1989 | European Pat. Off. | A23G 1/236 |
| 0351972 | 1/1990 | European Pat. Off. | A23G 3/30 |
| 0351973 | 1/1990 | European Pat. Off. | A23L 1/236 |
| 0368451 | 5/1990 | European Pat. Off. | C08B 30/18 |
| 0390438 | 10/1990 | European Pat. Off. | A23G 3/00 |
| 0398465 | 11/1990 | European Pat. Off. | C08B 37/00 |
| 0397027 | 11/1990 | European Pat. Off. | A01N 43/08 |
| 0421670 | 4/1991 | European Pat. Off. | A23G 3/30 |
| 0425115 | 5/1991 | European Pat. Off. | A23G 3/30 |
| 0438912 | 7/1991 | European Pat. Off. | A23L 1/308 |
| 0449594 | 10/1991 | European Pat. Off. | A23L 1/0526 |
| 0457098 | 11/1991 | European Pat. Off. | A23L 1/307 |
| 0472428 | 2/1992 | European Pat. Off. | A23G 3/30 |
| 0566174 | 10/1993 | European Pat. Off. | A23G 3/30 |
| 2626583 | 8/1989 | France | C12P 19/44 |
| 2115461 | 3/1971 | Germany | A23G 3/30 |
| 58-138355 | 8/1983 | Japan | A23L 1/236 |
| 60-224449 | 11/1985 | Japan | A23G 3/30 |
| 61-173748 | 6/1986 | Japan | A23G 3/30 |
| 62-146562 | 6/1987 | Japan | A23G 3/30 |
| 62-148496 | 7/1987 | Japan | C07H 15/4 |
| 1-19860 | 4/1989 | Japan | A23G 3/30 |
| 2-100695 | 4/1990 | Japan | C12P 19/14 |
| 2-154664 | 6/1990 | Japan | A23L 1/308 |
| 3-20301 | 1/1991 | Japan | C08B 37/00 |
| 3-47831 | 7/1991 | Japan | A23L 3/308 |
| 3-47832 | 7/1991 | Japan | A23L 1/308 |
| 347376 | 4/1931 | United Kingdom . | |
| 378073 | 8/1932 | United Kingdom | A23G 3/30 |
| 2063268 | 11/1979 | United Kingdom | C13K 13/00 |
| 2066639 | 11/1979 | United Kingdom | A23L 1/236 |
| 84/01693 | 5/1984 | WIPO | A23G 3/30 |
| 89/03170 | 4/1989 | WIPO . | |
| 90/06317 | 6/1990 | WIPO | C07H 15/04 |
| 90/06061 | 6/1990 | WIPO | A23G 3/30 |
| 90/07859 | 7/1990 | WIPO . | |
| 90/07864 | 7/1990 | WIPO . | |
| 3-03147 | 3/1991 | WIPO . | |
| 9210943 | 7/1992 | WIPO | A23G 3/30 |

OTHER PUBLICATIONS

"Fructooligosaccharides (FOS)—An All Natural, Versatile, Low–Calorie Bulking Agent", by Dr. Peter Perna, Coors Biotech, Inc. (date unknown).

"Polymer Handbook", Second Edition, by Bandrup & Immergut, John Wiley & Sons, Inc. (1975), pp. IV–337 to IV–375.

Raftilose, "Oligofructose", by Raffinerie Tirlemontoise S.A. and Tiense Suikerraffinaderij N.V.

"Soluble & Insoluble Bulking Agents, Prospects & Applications", by Smits and Norman, presented at IBC Bulking Agents Conference (Mar. 13, 1991).

"Textbook Of Polymer Science", Second Edition, by Billmeyer, Jr., John wiley & Sons, Inc. (1971), pp. 23–61.

L. A. Dreyfus Company—List Of Known Gum Base Compositions, 7 pp., Aug. 25, 1994.

Primary Examiner—Jeanette Hunter
Attorney, Agent, or Firm—Maxwell J. Petersen; Willian Brinks Hofer Gilson & Lione

[57] ABSTRACT

A wax-free abhesive chewing gum is provided which uses a gum base devoid or substantially free of wax and elastomer plasticizer. The gum base includes about 20 to about 75 weight percent synthetic elastomer, about 4 to about 45 weight percent filler, about 5 to about 55 weight percent gum base softener, and optional minor amounts of miscellaneous ingredients such as colors, antioxidants, etc. The abhesive wax-free chewing gum further comprises at least one flavoring agent, at least one bulk sweetener; and at least one controlled release sweetener. The controlled release sweetener is a sweetener whose release rate has been modified, preferably to provide a sweetness release profile similar to the release profile of at least one flavoring agent present in the abhesive chewing gum.

33 Claims, No Drawings

U.S. PATENT DOCUMENTS

| | | | |
|---|---|---|---|
| 4,139,639 | 2/1979 | Bahoshy et al. | 426/3 |
| 4,150,161 | 4/1979 | Rudolph et al. | 426/3 |
| 4,187,320 | 2/1980 | Koch et al. | 426/3 |
| 4,224,345 | 9/1980 | Tezuka et al. | 426/3 |
| 4,230,687 | 10/1980 | Sair et al. | 424/22 |
| 4,352,822 | 10/1982 | Cherukuri et al. | 426/4 |
| 4,352,823 | 10/1982 | Cherukuri et al. | 426/5 |
| 4,357,355 | 11/1982 | Koch et al. | 426/4 |
| 4,359,531 | 11/1982 | Bucke et al. | 435/97 |
| 4,382,963 | 5/1983 | Klose et al. | 426/3 |
| 4,384,004 | 5/1983 | Cea et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,497,846 | 2/1985 | Boursier et al. | 426/660 |
| 4,514,422 | 4/1985 | Yang et al. | 426/3 |
| 4,515,769 | 5/1985 | Merritt et al. | 424/49 |
| 4,528,206 | 7/1985 | Kastin | 426/660 |
| 4,556,429 | 12/1985 | Takazoe et al. | 127/30 |
| 4,579,738 | 4/1986 | Cherukuri et al. | 426/3 |
| 4,581,234 | 4/1986 | Cherukuri et al. | 426/3 |
| 4,587,119 | 5/1986 | Bucke et al. | 424/48 |
| 4,587,125 | 5/1986 | Cherukuri et al. | 424/48 |
| 4,597,970 | 7/1986 | Sharma et al. | 426/5 |
| 4,604,287 | 8/1986 | Glass et al. | 426/5 |
| 4,634,593 | 1/1987 | Stroz et al. | 426/5 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,683,138 | 7/1987 | Glass et al. | 426/5 |
| 4,695,326 | 9/1987 | Takazoe et al. | 127/30 |
| 4,728,515 | 3/1988 | Patel et al. | 426/3 |
| 4,737,366 | 4/1988 | Gergely et al. | 426/5 |
| 4,741,905 | 5/1988 | Huzinec | 426/3 |
| 4,765,991 | 8/1988 | Cherukuri et al. | 426/3 |
| 4,786,722 | 11/1988 | Zehner | 536/1.1 |
| 4,792,453 | 12/1988 | Reed et al. | 426/5 |
| 4,794,003 | 12/1988 | Cherukuri et al. | 426/6 |
| 4,802,924 | 2/1989 | Woznicki et al. | 427/3 |
| 4,804,544 | 2/1989 | Cherukuri et al. | 426/5 |
| 4,816,265 | 3/1989 | Cherukuri et al. | 426/5 |
| 4,872,884 | 10/1989 | Cherukuri et al. | 426/3 |
| 4,889,727 | 12/1989 | Dave et al. | 426/3 |
| 4,931,294 | 6/1990 | Yatka et al. | 426/3 |
| 4,933,188 | 6/1990 | Cherukuri et al. | 426/3 |
| 4,938,971 | 7/1990 | Chapdelaine et al. | 426/3 |
| 4,948,596 | 8/1990 | Bunick et al. | 426/3 |
| 4,954,353 | 9/1990 | Cherukuri et al. | 426/5 |
| 4,961,935 | 10/1990 | Cherukuri et al. | 426/3 |
| 4,971,787 | 11/1990 | Cherukuri et al. | 414/48 |
| 4,971,806 | 11/1990 | Cherukuri et al. | 426/5 |
| 4,975,287 | 12/1990 | Zibell et al. | 426/3 |
| 4,978,751 | 12/1990 | Biton et al. | 536/123 |
| 4,980,177 | 12/1990 | Cherukuri et al. | 426/3 |
| 4,983,405 | 1/1991 | Cherukuri et al. | 426/3 |
| 4,986,991 | 1/1991 | Yatka et al. | 426/3 |
| 5,009,900 | 4/1991 | Levine et al. | 426/96 |
| 5,023,093 | 6/1991 | Cherukuri et al. | 426/3 |
| 5,039,530 | 8/1991 | Yatka et al. | 426/3 |
| 5,041,294 | 8/1991 | Patel | 426/3 |
| 5,059,429 | 10/1991 | Cherukuri et al. | 426/3 |
| 5,066,511 | 11/1991 | Cherukuri et al. | 426/658 |
| 5,082,671 | 1/1992 | Cherukuri | 426/3 |
| 5,085,872 | 2/1992 | Patel et al. | 426/4 |
| 5,087,459 | 2/1992 | Chuu et al. | 426/4 |
| 5,100,678 | 3/1992 | Reed et al. | 426/3 |
| 5,120,550 | 6/1992 | Van der Schueren | 426/3 |
| 5,139,798 | 8/1992 | Yatka et al. | 426/5 |
| 5,165,944 | 11/1992 | Song et al. | 426/5 |
| 5,167,972 | 12/1992 | Greenberg et al. | 426/3 |
| 5,169,657 | 12/1992 | Yatka et al. | 426/5 |
| 5,169,658 | 12/1992 | Yatka et al. | 426/5 |
| 5,171,589 | 12/1992 | Richey et al. | 426/5 |
| 5,178,889 | 1/1993 | Reed et al. | 426/3 |
| 5,192,562 | 3/1993 | Grey et al. | 426/4 |

5,462,754

ABHESIVE CHEWING GUM WITH IMPROVED SWEETNESS PROFILE

RELATED APPLICATIONS

This application is a continuation-in-part of International Application No. PCT/US93/01940, filed on Mar. 2, 1993, which in turn is a continuation-in-part of International Application No. PCT/US92/11317, (Case No. 1391/1289), filed on Dec. 30, 1992, which in turn is a continuation-in-part of International Application No, PCT/US92/09615, filed on Nov. 6, 1992, which in turn is a continuation-in-part of PCT/US92/01686, filed on Mar. 3, 1992.

FIELD OF THE INVENTION

The present invention relates to an abhesive wax-free chewing gum and particularly to abhesive wax-free chewing gum products containing controlled release sweeteners.

BACKGROUND OF THE INVENTION

U.S. Pat. No. 3,984,574, issued to Comollo, discloses an abhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomers from chewing gum base, and substituted in their place one or more non-tacky synthetic elastomers such as polyisobutylene, polyisoprene, isobutylene-isoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids. Comollo did not teach controlled release of sweeteners with abhesive chewing gums.

When wax-free gum bases are combined with water-soluble chewing gum ingredients, including sweeteners, bulking agents, binders, and the like, and flavoring agents, it has been determined that the chewing gums tend to release certain flavoring ingredients at accelerated rates. Also, a greater overall quantity of flavor is released from wax-free gums. This results not only in a stronger initial flavor impact, but also in a stronger flavor in later stages of chewing. This is taught in U.S. Pat. No. 5,286,501, issued Feb. 15, 1994. These rapid release effects are further magnified when the gum base is also free of elastomer plasticizers, because elastomer plasticizers, when present, tend to control and delay flavor release. Therefore, there is a need or desire to adjust the release of sweeteners present in abhesive wax-free chewing gum so that the sweetness release is compatible with the increased flavor release.

SUMMARY OF THE INVENTION

The present invention is directed to an abhesive wax-free chewing gum containing controlled release sweeteners. The chewing gum of the invention includes a wax-free chewing gum base comprising quantities of synthetic elastomer, filler and softener, and, like the gum base of Comollo, is substantially free of elastomer plasticizers and wax. The gum base of the invention may also contain optional quantities of minor ingredients such as color and antioxidant.

To obtain a balanced release of flavor and sweeteners, which balance enhances the consumer's pleasure, the abhesive wax-free chewing gums of this invention include not only the wax-free gum bases described above, but also include flavors and sweeteners which release essentially concurrently. This requires a controlled sweetener release that provides rapid release to compliment the more rapid release of flavors in wax-free chewing gums, and also provides controlled, and longer term sweetener release, concurrently with stronger flavor release in later stages of the chew, thereby providing consumer pleasure over the life of the chew.

With the foregoing in mind, it is a feature and advantage of the invention to provide improved abhesive chewing gums which contain a wax-free chewing gum base and one or more controlled release sweeteners.

It is also a feature and advantage of the invention to provide improved abhesive wax-free chewing gums which do not retain the amount of flavor typical sugarless gums retain after chewing, but instead release flavoring ingredients at a rate greater than observed with a wax containing chewing gum, and provide controlled sweetener release at comparable rates to flavor release, both initially and throughout the chew.

It is also a feature and advantage of the invention to provide abhesive wax-free chewing gum products having desirable properties such as flavor quality and strength, flavor and sweetness retention, controlled rates of both flavor and sweetness release, as well as breath freshening, dental and oral health properties and good shelf stability.

The foregoing and other features and advantages will become further apparent from the following detailed description of the presently preferred embodiments, when read in conjunction with the accompanying examples. It should be understood that the detailed description and examples are illustrative rather than limiting, the scope of the present invention being defined by the appended claims and equivalents thereof.

DETAILED DESCRIPTION OF THE PRESENTLY PREFERRED EMBODIMENTS

In accordance with the invention, an abhesive chewing gum is provided, which may be either bubble gum or regular chewing gum. The chewing gum of the invention includes a gum base which is substantially free of waxes and elastomer plasticizers. The gum base includes about 20 to about 75 weight percent synthetic elastomer, 0 to about 30 weight percent natural elastomer, about 4 to about 45 weight percent filler, about 5 to about 55 weight percent base softener, and optional minor amounts (about one percent or less) of miscellaneous ingredients such as colorants, antioxidants, etc. Preferably, the gum base includes about 25–60% by weight synthetic elastomer, 0 to about 5% by weight natural elastomer, about 10–40% by weight filler, and about 15–45% by weight softener. Most preferably, the gum base is substantially free of natural elastomers.

Synthetic elastomers may include, but are not limited to, polyisobutylene preferably having GPC molecular weight of about 10,000 to about 95,000, isobutylene-isoprene copolymer (butyl elastomer), styrene-butadiene copolymers having styrene-butadiene ratios of about 1:3 to about 3:1, polyvinyl acetate preferably having GPC molecular weight of about 2,000 to about 90,000, polyisoprene, polyethylene, vinyl acetate-vinyl laurate copolymer having vinyl laurate content of about 5 to about 50 percent by weight of the copolymer, and combinations thereof. Preferred combinations include, but are not limited to polyisobutylene and styrene-butadiene, polyisobutylene and polyisoprene, polyisobutylene and isobutylene-isoprene copolymer (butyl rubber), polyisobutylene, styrene-butadiene copolymer, and isobutylene-isoprene copolymer, and all of the above in admixture with polyvinyl acetate, vinyl acetate-vinyl laurate copolymers and mixtures thereof.

Preferred ranges are, for polyisobutylene, 50,000 to 80,000 GPC molecular weight, for styrene-butadiene, 1:1 to 1:3 bound styrene-butadiene, for polyvinyl acetate, 10,000 to 65,000 GPC molecular weight with the higher molecular weight polyvinyl acetates typically used in bubble gum base, and for vinyl acetate-vinyl laurate, vinyl laurate content of 10–45 percent.

The gum base may be substantially free of natural elastomer, or may include quantities of natural elastomer in addition to the synthetic elastomer. When used, natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, chiquibul, crown gum, pendare, venezuelau chicle, leche de vaca, niger gutta, tunu, chilte and combinations thereof. The preferred natural elastomers are jelutong, chicle, sorva and massaranduba balata. The preferred elastomers and elastomer concentrations vary depending on whether the abhesive chewing gum in which the base is used is bubble gum or regular gum, as discussed below.

The term "wax-free" as used herein refers to the exclusion of waxes which contain mineral hydrocarbons. Natural waxes such as carnauba wax, beeswax, rice bran wax, and candellila wax do not contain mineral hydrocarbons and are therefor acceptable for use in the chewing gum base and chewing gums prepared therefrom. However, our gum bases preferably contain from 0–5 weight percent natural wax, and most preferably are free of both mineral hydrocarbon waxes, i.e. petroleum waxes, and natural waxes. The gum base is also substantially free of elastomer plasticizers, for example, terpene resins, rosin esters, ester gums, natural gums, and other natural resins and resin derivatives. The exclusion of elastomer plasticizers and waxes contributes to the abhesive character of the chewing gum.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Gum base softeners may include tallow, hydrogenated tallow, hydrogenated and partially hydrogenated vegetable oils, hydrogenated cottonseed oil, hydrogenated soybean oil, hydrogenated corn, peanut and palm oils, cocoa butter, glycerol monostearate, glycerol triacetate, lecithin, mono-, di- and triglycerides, acetylated monoglycerides, fatty acids (e.g. stearic, palmitic, oleic and linoleic acids), lanolin, diacetin, and combinations thereof. Partially hydrogenated vegetable oils are generally preferred, either alone or in combination with other softeners.

Colorants and whiteners may include FD and C-type dyes and lakes, fruit and vegetable extracts, titanium dioxide, cocoa powder and combinations thereof.

The wax-free gum base may also contain optional ingredients such as natural or synthetic antioxidants.

Specific and potential embodiments of the wax-free gum base are provided in Examples 1–15 below.

TABLE 1

Wax-Free Gum Bases For Use In Abhesive Chewing Gum

EXAMPLES 1–5

| GENERIC INGREDIENTS | IDENTIFICATION - EXAMPLE #: | | | | |
|---|---|---|---|---|---|
| | 1 | 2 | 3 | 4 | 5 |
| ** SYNTHETIC ELASTOMER ** | | | | | |
| POLYISOPRENE | — | — | — | — | — |
| BUTYL (ISOPRENE-ISOBUTYLENE) ELASTOMER | — | — | — | — | 25.0 |
| POLYISOBUTYLENE ELASTOMER | 35.0 | 10.0 | 17.0 | 20.0 | — |
| POLYVINYL ACETATE | — | 55.0 | 17.0 | 30.0 | 5.0 |
| ** FILLER ** | | | | | |
| CALCIUM CARBONATE | 25.0 | 25.0 | 40.0 | 5.0 | 25.0 |
| TALC | — | — | — | — | — |
| TRICALCIUM PHOSPHATE | — | — | — | — | — |
| ** SOFTENER ** | | | | | |
| PARTIALLY HYDROGENATED VEGETABLE OIL | 20.0 | 1.0 | 2.0 | 10.0 | — |
| GLYCEROL MONOSTEARATE | 10.0 | — | — | 5.0 | 5.0 |
| HYDROGENATED SOYBEAN OIL | 5.0 | 2.0 | — | 20.0 | 15.0 |
| HYDROGENATED COTTONSEED OIL | 5.0 | 2.0 | 8.0 | — | 25.0 |
| HYDROGENATED CORN, PEANUT AND PALM OILS | — | — | — | — | — |
| FATTY ACIDS (STEARIC AND PALMITIC) | — | 5.0 | 8.0 | 10.0 | — |
| LECITHIN | — | — | 8.0 | — | — |
| TOTAL PERCENT | 100.0 | 100.0 | 100.0 | 100.0 | 100.0 |

TABLE 1-continued

Wax-Free Gum Bases For Use In Abhesive Chewing Gum

EXAMPLES 6-10

| GENERIC INGREDIENTS | 6 | 7 | 8 | 9 | 10 |
|---|---|---|---|---|---|
| ** SYNTHETIC ELASTOMER ** | | | | | |
| POLYISOPRENE | — | — | 8.0 | 16.0 | 9.9 |
| BUTYL (ISOPRENE-ISOBUTYLENE) ELASTOMER | 9.0 | 14.1 | — | — | — |
| POLYISOBUTYLENE ELASTOMER | 16.9 | 12.1 | 18.0 | 10.0 | 15.5 |
| POLYVINYL ACETATE | 22.8 | 20.8 | 25.0 | 14.0 | 22.0 |
| ** FILLER ** | | | | | |
| CALCIUM CARBONATE | 12.0 | 13.9 | — | 5.0 | 12.9 |
| TALC | — | — | 10.0 | 5.0 | — |
| TRICALCIUM PHOSPHATE | — | — | — | 5.0 | — |
| ** SOFTENER ** | | | | | |
| PARTIALLY HYDROGENATED VEGETABLE OIL | 8.8 | 10.7 | 5.0 | — | 10.0 |
| GLYCEROL MONOSTEARATE | 1.7 | 3.7 | 6.0 | 2.0 | 2.7 |
| HYDROGENATED SOYBEAN OIL | 14.8 | 12.7 | 13.0 | — | 14.0 |
| HYDROGENATED COTTONSEED OIL | 14.0 | 12.0 | 10.0 | — | 13.0 |
| HYDROGENATED CORN, PEANUT AND PALM OILS | — | — | 5.0 | 40.0 | — |
| FATTY ACIDS (STEARIC AND PALMITIC) | — | — | — | 3.0 | — |
| LECITHIN | — | — | — | — | — |
| TOTAL PERCENT | 100.0 | 100.0 | 100.0 | 100.0 | 100.0 |

EXAMPES 11-15

| GENERIC INGREDIENTS | 11 | 12 | 13 | 14 | 15 |
|---|---|---|---|---|---|
| ** SYNTHETIC ELASTOMER ** | | | | | |
| POLYISOPRENE | — | — | — | — | — |
| BUTYL (ISOPRENE-ISOBUTYLENE) ELASTOMER | 9.9 | 10.0 | 10.0 | 13.3 | 10.0 |
| POLYISOBUTYLENE ELASTOMER | 15.5 | 15.9 | 15.9 | 21.2 | 15.9 |
| POLYVINYL ACETATE | 22.0 | 21.7 | 21.9 | 29.1 | 21.9 |
| ** FILLER ** | | | | | |
| CALCIUM CARBONATE | 12.9 | 13.3 | — | 17.7 | — |
| TALC | — | — | 13.1 | — | 13.1 |
| TRICALCIUM PHOSPHATE | — | — | — | — | — |
| ** SOFTENER ** | | | | | |
| PARTIALLY HYDROGENATED VEGETABLE OIL | 10.0 | 9.8 | — | 4.5 | 9.9 |
| GLYCEROL MONOSTEARATE | 2.7 | 2.7 | 2.6 | 2.0 | 2.0 |
| HYDROGENATED SOYBEAN OIL | 14.0 | 13.3 | 13.3 | 6.1 | 13.3 |
| HYDROGENATED COTTONSEED OIL | 13.0 | 13.3 | 13.3 | 6.1 | 13.3 |
| HYDROGENATED CORN, PEANLTT AND PALM OILS | — | — | 9.9 | — | — |
| FATTY ACIDS (STEARIC AND PALMITIC) | — | — | — | — | — |
| LECITHIN | — | — | — | — | — |
| TOTAL PERCENT | 100.0 | 100.0 | 100.0 | 100.0 | 100.0 |

The wax-free gum base of the invention constitutes about 5–95 weight percent of the abhesive chewing gum, more typically 10–50 weight percent of the abhesive chewing gum, and most commonly 20–35 weight percent of the abhesive chewing gum. The gum base is typically prepared by adding an amount of the elastomer and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into-coated or lined pans, extruded or cast into any desirable shape and allowed to cool and solidify.

There are some variations to the above described preferred method which in no way limit the method as described. Those skilled in the art of gum base manufacture may be able to appreciate any minor variations.

In producing prior art wax-containing gum bases high in polyvinyl acetate, and particularly those high in high molecular weight polyvinyl acetate, it has been necessary to improve blending of the ingredients by removing the heat applied to the sigma blade mixer at some point in the process. This reduces the temperature of the gum base and causes greater compatibility of its ingredients. In the process for making the abhesive gum base free of elastomer plasticizer and wax, there is no need to remove the heat applied. The degree of incompatibility is greatly reduced since there is no wax present. Nevertheless, heat is preferably removed at about 30 minutes to about 90 minutes into the mixing time of the base production process.

THE CHEWING GUMS OF THE INVENTION

In addition to the substantially wax-free, elastomer plasticizer-free water-insoluble gum base, the abhesive chewing gum composition includes a water-soluble bulking agent, one or more flavoring agents, and one or more controlled release sweeteners.

The water-soluble bulking agent of the chewing gum may include chewing gum softeners, bulk sweeteners, high-intensity sweeteners, flavoring agents and combinations thereof. Softeners are added to the chewing gum in order to optimize the chewability and mouth feel of the gum. The gum softeners, which are also known as gum plasticizers or plasticizing agents, generally constitute between about 0.5–15% by weight of the chewing gum. The gum softeners may include glycerin, lecithin, glycerol monostearate, glycerol triacetate, hydroxylated lecithin, agar, carrageenan, and combinations thereof. Aqueous sweetener solutions, syrups, and the like, such as those containing sorbitol, hydrogenated starch hydrolyzates, corn syrup and combinations thereof, may also be used as softeners and binding agents in the wax-free chewing gums of this invention.

Bulk sweeteners may constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, high maltose syrup, invert/high fructose syrup, maltotriose, glyceraldehyde, erythrose, xylose, lactose, leucrose, L-sugars, fructooligosaccharide and low calorie bulking/binding agents such as indigestible dextrin, guar gum hydrolyzate, oligofructose, polydextrose, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolyzates, maltitol, lactitol, erythritol, cellobiitol, and the like, alone or in combination.

High-intensity sweeteners may also be present and are commonly used with sugarless sweeteners. When used, high-intensity sweeteners typically constitute between 0.001–5% by weight of the chewing gum, preferably between 0.01–1% by weight of the chewing gum. Typically, high-intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, stevia and the like, alone or in combination.

The abhesive chewing gum of the invention further includes at least one controlled release sweetener. A controlled release sweetener can be any high intensity sweetener whose release characteristics have been modified, for example, to achieve a delayed or other controlled release of sweetness. The controlled release sweetener can be incorporated into the wax-free chewing gum after being modified, such as by encapsulating the sweetener, in order to modify its release. The most common ways of modifying the release of the active sweetening ingredients include spray drying, spray chilling, fluid-bed coating, coacervation, absorption, extrusion encapsulation, and other standard encapsulating techniques. The active sweetener ingredient may be modified in a multiple step process comprising any of the processes noted. Encapsulating agents that can be used include polyvinyl acetate, acrylic polymers and copolymers, carboxyvinyl polymer, polyamides, polystyrene, polyvinyl pyrrolidone, natural waxes, zein, shellac, agar, alginates, a wide range of cellulose derivatives including ethyl cellulose, methyl cellulose, sodium hydroxymethyl cellulose, and hydroxypropylmethyl cellulose and sodium carboxy methyl cellulose, dextrin, gelatin, modified starches, maltodextrin, gum arabic, xanthan gum, gelatin and pectin.

Controlled release sweeteners can also be obtained by selecting sweeteners that are, by their nature, fast release sweeteners and those which are, by their nature, slow release sweeteners, and blending them with the wax-free gum bases of the invention to obtain the wax-free chewing gum of this invention having both fast flavor release to compliment normally faster flavor release from wax-free chewing gums, and controlled sweetness (slower) release to sustain consumer pleasure during the chew. The blend is accomplished so as to provide controlled total sweetener release in a way so as to give an available sweetener profile comparable to, or similar to, the flavor profile available to the consumer. This perception of available flavor and sweetener profile provides enhanced consumer pleasure not only during the initial sweetener and flavor release, but throughout the chew.

Similarly, a sweetener which is normally a fast release sweetener may be modified to become a slower release sweetener, or a normally slow release sweetener may be modified to become a faster release sweetener. These may then be used in those combinations which provide effective sweetness release for the wax-free, elastomer plasticizer-free chewing gums of this invention.

Combinations of sugar and/or sugarless sweeteners may be used in the wax-free chewing gum. The sweetener may also function in the chewing gum in whole or in part as a water-soluble bulking agent. Additionally, the softener may also provide additional sweetness such as with aqueous sugar or alditol solutions.

Fast release sweeteners contemplated include such low-intensity sweeteners as sucrose, dried invert sugar, fructose, xylitol, and combinations thereof. Fast release sweeteners also include most high-intensity sweeteners, for example, those sweeteners selected from aspartame, acesulfame K, alitame, saccharin, cyclamate, used either alone, or in combination. However, these high-intensity sweeteners may be modified, as will be seen later, to become controlled release (or slow release) sweeteners.

Fast release sweeteners, as contemplated above, normally release about 60% of their sweetness, or more, in the first five (5) minutes of chewing. Further, the fast release sweeteners normally have a sweetness intensity at least about equal to, or greater than, that provided by sucrose. Therefore, these sweeteners provide a relatively high impact of sweetness during the first three (3) minutes of chewing.

Fast release sweeteners may be found as natural sweeteners or they may be synthetic sweeteners. They may be treated or modified to provide for rapid or fast sweetness release. For example, sucralose, normally a slow release sweetener, when spray dried with maltodextrin gives a fast release sweetener.

Sweeteners which do not meet the requirements set forth above for fast release sweeteners are referred to herein as slow release sweeteners. The slow release sweeteners may be natural or synthetic. They may be low sweetness, or high sweetness ingredients. They may be fast release sweeteners formulated, reacted or modified in such a way as to become slow release sweeteners.

Such slow release sweeteners include, but are not necessarily limited to, sorbitol, mannitol, dextrose, maltose, corn syrup solids, galactose, dextrin, hydrogenated starch hydrolyzates, maltitol, isomaltitol and the high-intensity sweeteners sucralose, thaumatin, hydrochalcone and monellin. The slow release, or controlled release sweeteners may also include the encapsulated, agglomerated, or absorbed high intensity sweeteners, including, for example, encapsulated high intensity, normally fast release sweeteners.

For example, Yatka, in International Application No. PCT/US90/06038 (International Publ. No. WO 91/03147) taught a method of controlling release of stevioside in chewing gum. Stevioside, normally a fast release sweetener, was converted into a controlled release (or slow release) sweetener by coating, encapsulating, agglomerating, entrapping by absorption, or treating by multiple steps of encapsulating, agglomerating, and absorption. Ingredients such as the encapsulating agents mentioned above may be used.

Yatka, in International Application No. PCT/US88/04400 (International Pubi. No. WO 89/03170) also teaches similar methods of controlling release of Acesulfame K in chewing gums. Also, in International Application No. PCT/US89/01269 (International Publ. No. WO 90/06061), Yatka demonstrates controlled release of Alitame in chewing gum.

Similar controlled release sweeteners including sucralose; Yatka, International Application PCT/US89/05296 (International Publ. No. WO 90/07859), Glycyrrhizin; Yatka, International Application No. PCT/US90/02255 (International Publ. No. WO 90/07864); and Dihydrochalcones; Yatka, International Application No. PCT/US90/04002 (International Publ. No. 90/13994) have been taught.

In addition to the above International Patent Applications/Publications, all of which are incorporated herein by reference, the following U.S. patents have taught various techniques of providing for either slowed release of sweeteners from, or in some cases, modified flavor release from, as providing for improved shelf life of, chewing gums or other digestible or consumable products:

U.S. Pat. No. 4,139,639, Bahosky et al.
U.S. Pat. No. 4,230,687, Sair et al.
U.S. Pat. No. 4,384,004, Cea et al.
U.S. Pat. No. 4,386,106, Merritt et al.
U.S. Pat. No. 4,515,769, Merritt et al.
U.S. Pat. No. 4,597,970, Sharma et al.
U.S. Pat. No. 4,634,593, Stroz et al.
U.S. Pat. No. 4,986,991, Yatka et al.
U.S. Pat. No. 5,039,530, Yatka et al.
U.S. Pat. No. 5,041,294, Patel et al.
U.S. Pat. No. 5,100,678, Reed et al.

As those familiar with the art will recognize, either or both fast release and slow release sweeteners may serve as bulking agents or binders in chewing gum formulations, and the same is true for our wax-free chewing gums. The wax-free chewing gums do, however, preferably contain additional binding agents, since binding is one of the functions served by wax, when present in chewing gums.

Flavoring agents should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, food acidulants, emulsifiers, pharmaceutical agents, vitamins, and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

The following formulas are illustrative of abhesive (non-tack) chewing gums which may be produced. All ingredient levels are expressed in weight percent.

Examples 16–27 illustrate use of the invention with abhesive sugar stick gums while Examples 28–44 describe abhesive sugarless or non-sucrose containing stick gums. Examples 45–56 illustrate abhesive sugar-containing and sugarless pellet gums which are coated with a shell. Examples 57–62 illustrate abhesive bubble gum bases and bubble gum formulations. Preferably, the chewing gums manufactured according to the invention will have a combination of slow release and fast release sweeteners, which combination provides for comparable, or similar sweetness release profiles when measured with flavor release profiles. Most preferably, the combination is created such that the perceived rate of sweetness release is similar to the perceived rate of flavor release. Sweetener release profile is a measure of the sensory perception of sweetener intensity released per unit time. Flavor release profile is similarly defined.

Encapsulated sweeteners may be used to extend sweetness and flavor and to protect the sensitive sweeteners from degradation during storage. Certain naturally slow release sweeteners, such as sucralose, may be encapsulated or codissolved and spray-dried to provide fast release, if the powdered or crystalline sweetener would normally provide for slow release. Low moisture products having moisture levels below 2% are also within the scope of the invention.

TABLE 2

Sugar-Containing Non-Tack Gums

EXAMPLES 16–21

| Example | 16 | 17 | 18 | 19 | 20 | 21 |
|---|---|---|---|---|---|---|
| Base Example # | 11 | 11 | 12 | 11 | 11 | 12 |
| Base % | 20.12 | 23.20 | 27.20 | 21.22 | 22.10 | 24.00 |
| Flavor | 0.20 (Spray Dried Peppermint) | 1.10 (Cinnamon) | 1.55 (Wintergreen) | 0.10 (Spray Dried Menthol) | 0.10 (Peppermint) | 0.90 (Peppermint) |
| Flavor | 0.91 (Spearmint) | — | 0.10 (Spray Dried Menthol) | 0.85 (Spearmint) | 0.90 (Spearmint) | 0.10 (Spearmint) |
| Sugar | 58.70 | 60.96 | 55.60 | 60.60 | 60.34 | 61.19 |
| Sorbitol | 1.20 | 0.68 | — | 0.68 | 0.70 | — |
| Encapsulated Acesulfame K | 0.10 | 0.30 | — | 0.30 | 0.41 | — |
| Encapsulated Aspartame | 0.10 | — | 0.2 | — | — | 0.1 |
| Calcium Carbonate | 3.10 | — | — | — | — | — |
| Corn Syrup | 13.47 | 12.11 | 13.71 | 14.80 | 14.00 | 12.20 |
| Lecithin | — | 0.15 | 0.10 | 0.15 | 0.15 | 0.20 |
| Glycerin | 2.10 | 1.50 | 1.54 | 1.30 | 1.30 | 1.41 |
| TOTAL | 100 | 100 | 100 | 100 | 100 | 100 |

EXAMPLES 22–27

| Example | 22 | 23 | 24 | 25 | 26 | 27 |
|---|---|---|---|---|---|---|
| Base Example # | 6 | 7 | 11 | 12 | 13 | 12 |
| Base % | 22.38 | 20.60 | 20.08 | 23.11 | 20.02 | 21.01 |
| Flavor | 0.89 (Peppermint Oil) | 0.58 (Spearmint Oil) | 0.86 (Peppermint Oil) | 0.91 (Peppermint Oil) | 1.21 (Fruit Flavor) | 0.98 (Wintergreen Flavor) |
| Flavor | — | — | — | 0.21 (Spearmint Oil) | — | 0.20 (Spray Dired Menthol) |
| Encapsulated Aspartame | 0.1 | — | — | 0.05 | — | — |
| Encapsulated Acesulfame K | — | 0.1 | — | 0.05 | 0.15 | 0.1 |
| Sucralose | — | — | 0.1 | — | — | 0.09 |
| Sugar | 58.29 | 59.39 | 62.56 | 59.97 | 63.59 | 62.41 |
| Corn Syrup | 17.20 | 18.50 | 15.40 | 14.70 | 13.88 | 14.19 |
| Glycerin | 1.09 | 0.83 | 1.00 | 1.00 | 1.05 | 1.02 |
| Lecithin | 0.05 | — | — | — | .10 | — |
| TOTAL | 100 | 100 | 100 | 100 | 100 | 100 |

TABLE 3

Sugarless Non-Tack Gums

EXAMPLES 28–33

| Example | 28 | 29 | 30 | 31 | 32 | 33 |
|---|---|---|---|---|---|---|

TABLE 3-continued

Sugarless Non-Tack Gums

| Base Example # | 13 | 11 | 11 | 12 | 11 | 12 |
|---|---|---|---|---|---|---|
| Base % | 24.00 | 27.11 | 21.21 | 29.48 | 22.58 | 18.11 |
| Flavor | 1.07 (Citrus Oils) | 0.98 (Peppermint) | 0.97 (Spearmint Oil) | 1.15 (Peppermint Oil) | 1.47 (Cinnamon Flavor) | 1.00 (Wintergreen Oil) |
| Flavor | — | 0.20 (Spray Dried Menthol) | 0.15 (Peppermint Oil) | 0.21 (Spearmint Oil) | — | 0.27 (Peppermint Oil) |
| Sorbitol | 61.37 | 55.06 | 59.79 | 55.15 | 60.01 | 57.53 |
| Calcium Carbonate | — | — | 2.11 | — | 2.00 | 4.70 |
| Sorbitol Solution | 6.42 | — | — | — | — | — |
| Coevaporated Lycasin (7.5% water, 25% glycerin) | — | 9.16 | — | 8.11 | — | 8.88 |
| Glycerin | 4.70 | 4.11 | 12.11 | 3.11 | 11.61 | 7.10 |
| Mannitol | 2.10 | 3.10 | 3.11 | 2.66 | 2.00 | 2.00 |
| Encapsulated Aspartame | 0.19 | — | 0.25 | — | — | 0.21 |
| Free Aspartame | 0.05 | — | 0.10 | — | — | — |
| Encapsulated Alitame | — | 0.05 | — | 0.10 | — | — |
| Free Alitame | — | — | — | 0.03 | — | 0.10 |
| Encapsulated Sucralose | — | — | — | — | 0.21 | — |
| Free Sucralose | — | 0.08 | — | — | 0.02 | — |
| Lecithin | 0.10 | 0.15 | 0.20 | — | 0.10 | 0.10 |
| TOTAL | 100 | 100 | 100 | 100 | 100 | 100 |

EXAMPLES 34-38

| Example | 34 | 35 | 36 | 37 | 38 |
|---|---|---|---|---|---|
| Base Example # | 11 | 11 | 12 | 11 | 12 |
| Base % | 24.7 | 19.2 | 24.0 | 19.2 | 19.2 |
| Sorbitol | 6.0 | — | — | — | — |
| Mannitol | 1.0 | — | — | — | — |
| Corn Syrup | — | 6.0 | 24.5 | 18.5 | 6.0 |
| Dextrose | — | 9.8 | — | 9.8 | 9.7 |
| Lactose | — | 5.0 | — | — | 5.0 |
| Glycerin | 16.4 | 9.8 | 0.4 | 1.4 | 8.9 |
| Lecithin | 0.2 | — | — | — | — |
| Flavor | 1.4 | 0.9 | 1.0 | 0.9 | 0.9 |
| Oligofructose | — | 50.0 | 50.0 | — | — |
| Fructooligosaccharide | — | — | — | 50.0 | 50.0 |
| Color | 0.05 | — | — | — | — |
| Aspartame | 0.25 | 0.2 | — | 0.1 | 0.2 |
| Alitame | — | — | 0.1 | 0.1 | 0.1 |
| Low Mol. Weight Indigestible Dextrin | 50.0 | — | — | — | — |
| TOTAL | 100 | 100 | 100 | 100 | 100 |

EXAMPLES 39-44

| Example | 39 | 40 | 41 | 42 | 43 | 44 |
|---|---|---|---|---|---|---|
| Base Example # | 11 | 11 | 12 | 13 | 11 | 12 |
| Base % | 21.76 | 22.07 | 24.00 | 20.97 | 26.00 | 20.08 |
| Flavor | 0.92 (Peppermint Oil) | 0.77 (Spearmint Oil) | 0.83 (Spearmint Oil) | 0.99 (Cinnamon Flavor) | 0.97 (Peppermint Oil) | 1.04 (Peppermint Oil) |
| Flavor | — | 0.24 (Peppermint Oil) | — | — | — | 0.16 (Spray Dried Menthol) |
| Sorbitol | 46.44 | — | — | 63.61 | 51.40 | — |
| Coevaporated Lycasin (7.5% Water, 25% Glycerin) | 8.47 | 7.84 | 11.20 | 7.76 | — | — |

TABLE 3-continued

| Sugarless Non-Tack Gums | | | | | | |
|---|---|---|---|---|---|---|
| Glycerin | 5.19 | 4.91 | 2.10 | 4.20 | 12.00 | — |
| Mannitol | 1.77 | — | — | 2.01 | 3.11 | — |
| Xylitol | 15.11 | — | 12.11 | — | 6.27 | 78.16 |
| Palatinit (Hydrogenated Isomaltulose) | — | 63.97 | 49.60 | — | — | — |
| Aspartame | 0.1 | — | — | 0.14 | — | 0.14 |
| Encapsulated Aspartame | — | — | — | 0.22 | — | 0.22 |
| Alitame | — | 0.02 | 0.02 | — | 0.1 | — |
| Encapsulated Alitame | — | 0.04 | 0.04 | — | — | — |
| Sucralose | 0.11 | — | — | — | 0.15 | — |
| Lecithin | 0.13 | 0.14 | 0.10 | 0.10 | — | 0.20 |
| TOTAL | 100 | 100 | 100 | 100 | 100 | 100 |

As stated above, Examples 45–56 are examples of inventive coated abhesive pellet gums made with non-wax bases. The gum products of these examples are formed into pellets or balls for subsequent coating. Examples 45–50 are sugar pellets which could be coated with sugar syrups. Such syrups may contain modified starch (0 to 6.0%), compatible flavors and colors (0 to 0.30%), vegetable gums such as gum arabic and cellulose derivatives such as hydroxypropyl methyl cellulose (0 to 20%) in addition to sucrose or starch hydrolyzate in an aqueous solution.

Examples 51–56 are sugarless pellets which can be coated with sugar alcohol solutions such as those of sorbitol, xylitol and palatinit. These syrups may also contain the same modifiers listed above for sugar syrups.

In both cases (sugar and sugarless) dry coating agent (sugar or sugar alcohol) may be added between layers of coating syrup, a process known as dry charging or soft panning.

Coating may be carried out by any suitable process, most often using a conventional pan, side vented pans, high capacity pans such as those made by Driam or Dumouline, or by continuous panning techniques.

TABLE 4

| Sugar Pellet Abhesive Gums For Coating EXAMPLES 45–50 | | | | | | |
|---|---|---|---|---|---|---|
| Example | 45 | 46 | 47 | 48 | 49 | 50 |
| Base Example # | 6 | 7 | 7 | 13 | 11 | 12 |
| Base % | 24.32 | 24.28 | 24.30 | 24.27 | 25.17 | 24.33 |
| Flavor | 0.55 (Spearmint Oil) | 0.73 (Peppermint Oil) | 2.56 (Licorice Powder) | 0.77 (Fruit Flavor) | 0.47 (Spearmint Oil) | 0.61 (Spearmint Oil) |
| Flavor | — | — | 0.60 (Methol/Anethol) | — | 0.15 (Peppermint Oil) | — |
| Sugar | 52.92 | 52.77 | 50.84 | 52.75 | 52.49 | 52.74 |
| Corn Syrup | 22.16 | 22.12 | 21.60 | 22.11 | 21.62 | 22.22 |
| Encapsulated Alitame | 0.05 | — | — | — | 0.05 | — |
| Encapsulated Acesulfame K | — | — | 0.1 | — | — | 0.05 |
| Encapsulated Aspartame | — | 0.1 | — | — | 0.05 | 0.05 |
| Sucralose | — | — | — | 0.1 | — | — |
| TOTAL | 100 | 100 | 100 | 100 | 100 | 100 |

TABLE 5

Sugarless Pellet Abhesive Gums For Coating
EXAMPLES 51–56

| Example | 51 | 52 | 53 | 54 | 55 | 56 |
|---|---|---|---|---|---|---|
| Base Example # | 11 | 12 | 12 | 13 | 6 | 7 |
| Base % | 31.01 | 33.00 | 32.71 | 33.03 | 30.97 | 31.45 |
| Flavor | 1.20 (Spearmint Oil) | 1.30 (Peppermint Oil) | 1.09 (Spearmint Oil) | 1.50 (Fruit Flavor) | 1.01 (Peppermint Oil) | 1.31 (Fruit Flavor) |
| Flavor | — | 0.50 (Menthol) | 0.17 (Peppermint Oil) | 0.50 (Lemon Flavor) | 0.21 (Spray Dried Menthol) | — |
| Sorbitol | 51.46 | 44.06 | 45.56 | 43.81 | 46.69 | 45.99 |
| Calcium Carbonate | 10.01 | 13.00 | 12.16 | 12.93 | 13.04 | 13.33 |
| Glycerin | 6.14 | 8.00 | 8.00 | 7.98 | 7.82 | 7.30 |
| Encapsulated Aspartame | 0.12 | 0.14 | 0.21 | 0.25 | 0.18 | 0.62 |
| Free Aspartame | 0.06 | — | 0.10 | — | 0.08 | — |
| TOTAL | 100 | 100 | 100 | 100 | 100 | 100 |

The present invention includes abhesive wax-free bubble gums as well as non-bubble gums. Some bases which can be used in abhesive wax-free bubble gums of the invention are described in Examples 57–59 below. Potential abhesive wax-free bubble gum formulations are described in Examples 60–62 below.

TABLE 6

Wax-Free Gum Bases Useful In Abhesive Bubble Gum
EXAMPLES 57–59

| GENERIC INGREDIENTS | IDENTIFICATION - EXAMPLE #: | | |
|---|---|---|---|
| | 57 | 58 | 59 |
| ** SYNTHETIC ELASTOMER ** | | | |
| STYRENE-BUTADIENE ELASTOMER | 9.9 | 13.0 | 13.0 |
| POLYISOBUTYLENE ELASTOMER | 15.5 | 12.4 | 12.4 |
| POLYVINYL ACETATE | 22.0 | 22.0 | 22.0 |
| ** FILLER ** | | | |
| CALCIUM CARBONATE | 12.9 | — | 12.9 |
| TALC | — | 12.9 | — |
| ** SOFTENER ** | | | |
| PARTIALLY HYDROGENATED VEGETABLE OIL | 10.0 | 10.0 | 10.0 |
| GLYCEROL MONOSTEARATE | 2.7 | 2.7 | 2.7 |
| HYDROGENATED SOYBEAN OIL | 14.0 | 14.0 | 16.0 |
| HYDROGENATED COTTONSEED OIL | 13.0 | 13.0 | 11.0 |
| TOTAL PERCENT | 100.0 | 100.0 | 100.0 |

TABLE 7

Wax-Free Abhesive
(Sugar-Containing) Bubble Gums
EXAMPES 59–62

| Example | 60 | 61 | 62 |
|---|---|---|---|
| Base Example # | 57 | 58 | 59 |
| Base % | 24.0 | 22.0 | 24.0 |
| Flavor | 0.9 | 0.9 | 1.2 |
|  | (Fruit Flavor) | (Fruit Flavor) | (Fruit Flavor) |
| Citric Acid | — | 0.3 | — |
| Sugar | 56.4 | 55.7 | 57.6 |
| Encapsulated Aspartame | 0.1 | — | — |
| Encapsulated Acesulfame K | — | 0.1 | — |
| Sucralose | — | — | 0.1 |
| Corn Syrup | 17.5 | 19.0 | 16.0 |
| Glycerin | 1.0 | 2.0 | 1.0 |
| Lecithin | 0.1 | — | 0.1 |
| TOTAL | 100 | 100 | 100 |

It should be appreciated that the products and methods of the present invention are capable of being incorporated in the form of a variety of embodiments, only a few of which have been illustrated and described above. The invention may be embodied in other forms without departing from its spirit or essential characteristics. It will be appreciated that the addition of certain other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A substantially wax-free abhesive chewing gum having controlled sweetener release comprising a chewing gum base substantially free of waxes and elastomer plasticizers, the gum base including:

| Ingredient | Wt. Percent of Gum Base |
|---|---|
| Synthetic Elastomer | about 20–75 weight percent, |
| Natural Elastomer | zero to about 30 weight percent, |
| Filler | about 4–45 weight percent, |
| Fats, Oils, Softeners | about 5–55 weight percent; | said wax-free chewing gum further comprising at least one flavoring agent, a water-soluble bulking agent, and at least one controlled release sweetener ingredient.

2. The chewing gum of claim 1 wherein the synthetic elastomer comprises a material selected from the group consisting of polyisobutylene, butadiene-styrene copolymer, polyvinyl acetate, vinyl acetate-vinyl laurate copolymer, polyisoprene, isobutylene-isoprene copolymer, and combinations thereof.

3. The chewing gum of claim 1, wherein the gum base is substantially free of natural elastomers.

4. The chewing gum of claim 1 wherein the controlled release sweetener comprises a high intensity sweetener with modified release characteristics.

5. The chewing gum of claim 1 wherein the filler comprises a material selected from the group consisting of calcium carbonate, magnesium carbonate, talc, ground limestone, magnesium silicate, aluminum silicate, clay, alumina, titanium dioxide, mono-, di- and tri-calcium phosphates, cellulose, and combinations thereof.

6. The chewing gum of claim 1 wherein the softener comprises a material selected from the group consisting of tallow, hydrogenated tallow, hydrogenated vegetable oils, partially hydrogenated vegetable oils, hydrogenated cottonseed oil, hydrogenated soybean oil, hydrogenated corn, peanut and palm oils, cocoa butter, glycerol monostearate, mono-, di- and triglycerides, acetylated monoglycerides, glyceryl triacetate, lecithin, fatty acids, diacetin, lanolin, and combinations thereof.

7. The chewing gum of claim 1, wherein the gum base consists essentially of:

about 25 to about 60 weight percent synthetic elastomer;

about 10 to about 40 weight percent filler; and about 15 to about 45 weight percent softener.

8. The chewing gum of claim 4, wherein the high intensity sweetener is encapsulated.

9. The chewing gum of claim 4, wherein the high intensity sweetener is spray dried.

10. The chewing gum of claim 4, wherein the high intensity sweetener is combined with another high intensity sweetener to provide modified release characteristics.

11. The chewing gum of claim 4, wherein the controlled release sweetener comprises a high intensity sweetener selected from the group consisting of sucralose, aspartame, salts of acesulfame, alitame, saccharin and its salts, cyclamic acid and its salts, glycyrrhizin, dihydrochalcones, thaumatin, monellin, stevia, and combinations thereof.

12. A wax-free abhesive chewing gum having controlled sweetness release, comprising:

a water-soluble bulking agent;

one or more flavoring agents;

a water insoluble chewing gum base consisting essentially of about 25 to about 60 percent synthetic elastomer, zero to about 5 percent natural elastomer, about 10 to about 40 percent filler, and about 15 to about 45 percent softener, by weight of the gum base, and at least one high intensity sweetener ingredient having modified release characteristics.

13. The wax-free chewing gum of claim 12, wherein the synthetic elastomer is selected from the group consisting of polyisoprene, isoprene-isobutylene copolymer, polyisobutylene, polyvinyl acetate and combinations thereof.

14. The wax-free chewing gum of claim 13, wherein the filler is selected from the group consisting of calcium carbonate, talc, tricalcium phosphate, and combinations thereof.

15. The wax-free chewing gum of claim 13, wherein the softener is selected from the group consisting of partially hydrogenated vegetable oils, hydrogenated soybean oil, hydrogenated cottonseed oil, hydrogenated corn, peanut and palm oils, fatty acids, glycerol monostearate, lecithin, and combinations thereof.

16. The wax-free chewing gum of claim 12, wherein the high intensity sweetener ingredient comprises an encapsulated high intensity sweetener.

17. The wax-free chewing gum of claim 12 wherein the high intensity sweetener ingredient comprises at least one fast release sweetener and at least one slow release sweetener.

18. A wax-free abhesive chewing gum, comprising:
   a water-soluble bulking agent;
   one or more flavoring agents; and
   a water insoluble chewing gum base comprising about 20 to about 75 percent synthetic elastomer, about 4 to about 45 percent filler, and about 5 to about 55 percent softener, by weight of the chewing gum base, and substantially no wax or elastomer plasticizer; and
   at least one controlled release sweetener having a release profile comparable to the release profile of at least one of the flavoring agents.

19. The wax-free chewing gum of claim 18, wherein the synthetic elastomer comprises a material selected from the group consisting of polyisoprene, isoprene-isobutylene copolymer, polyisobutylene, polyvinyl acetate, and combinations thereof.

20. The wax-free chewing gum of claim 18, wherein the controlled release sweetener comprises a fast release sweetener modified to give slower sweetness release.

21. The wax-free chewing gum of claim 18, wherein the controlled release sweetener comprises a slow release sweetener modified to give faster sweetness release.

22. The wax-free chewing gum of claim 18, wherein the filler comprises a material selected from the group consisting of calcium carbonate, talc, tricalcium phosphate, and combinations thereof.

23. The wax-free chewing gum of claim 18, wherein the softener comprises a material selected from the group consisting of partially hydrogenated vegetable oils, hydrogenated soybean oil, hydrogenated cottonseed oil, hydrogenated corn, peanut and palm oils, fatty acids, glycerol monostearate, lecithin, and combinations thereof.

24. A wax-free abhesive chewing gum, comprising:
   a water-soluble bulking agent;
   one or more flavoring agents; and
   a substantially wax-free chewing gum base including about 20 to about 75 weight percent synthetic elastomer, about 4 to about 45 weight percent filler, and about 5 to about 55 weight percent softener, and
   a combination of sweeteners having a sweetness release profile comparable to the flavor release profile of the flavoring agent, and including at least one controlled release sweetener.

25. The wax-free chewing gum of claim 24, wherein the synthetic elastomer comprises a material selected from the group consisting of polyisoprene, isoprene-isobutylene elastomer, polyisobutylene, polyvinyl acetate, and combinations thereof.

26. The wax-free chewing gum of claim 24, wherein the filler comprises a material selected from the group consisting of calcium carbonate, talc, tricalcium phosphate, and combinations thereof.

27. The wax-free chewing gum of claim 24, wherein the softener comprises a material selected from the group consisting of glycerol monostearate, partially hydrogenated vegetable oil, hydrogenated soybean oil, hydrogenated cottonseed oil, hydrogenated corn, peanut and palm oils, lecithin, and combinations thereof.

28. The wax-free chewing gum of claim 24, wherein the controlled release sweetener comprises an encapsulated high intensity sweetener.

29. A wax-free abhesive chewing gum comprising gum base, flavor and at least one controlled release sweetener; said gum base consisting primarily of:
   about 20 to about 75 weight percent synthetic elastomer;
   about 4 to about 45 weight percent filler; and
   about 5 to about 55 weight percent softener;
   wherein the controlled release sweetener includes at least one fast release sweetener and at least one slow release sweetener.

30. The chewing gum of claim 29 wherein the gum base is substantially free of elastomer plasticizers and natural elastomers.

31. The chewing gum of claim 29 wherein the gum is a sugarless gum.

32. The chewing gum of claim 29 wherein the gum is a sugar gum.

33. The chewing gum of claim 29 wherein the gum is in the form of a coated pellet or ball.

* * * * *

UNITED STATES PATENT AND TRADEMARK OFFICE
CERTIFICATE OF CORRECTION

PATENT NO. : 5,462,754
DATED : October 31, 1995
INVENTOR(S) : Steven P. Synosky et al.

It is certified that error appears in the above-indentified patent and that said Letters Patent is hereby corrected as shown below:

On the Title Page : Item [56]

Under the heading "OTHER PUBLICATIONS", line 13, delete "wiley" and substitute --Wiley--.

Under the heading "ABSTRACT", line 5, after the first occurrence of "percent" delete ",".

Item [56] in the second column under "U.S. PATENT DOCUMENTS", please add the following:

--5,165,943    11/1992    Patel et al.    426/3--.

Signed and Sealed this

Seventeenth Day of June, 1997

BRUCE LEHMAN

*Attest:*

*Attesting Officer*    Commissioner of Patents and Trademarks